(12) United States Patent
Richter et al.

(10) Patent No.: US 8,557,205 B2
(45) Date of Patent: Oct. 15, 2013

(54) METHOD AND DEVICE FOR SEPARATING OF CARBON DIOXIDE FROM AN EXHAUST GAS OF A FOSSIL-FIRED POWER PLANT

(75) Inventors: Peter Richter, Waldems (DE); Rüdiger Schneider, Eppstein (DE); Henning Schramm, Frankfurt am Main (DE)

(73) Assignee: Siemens Aktiengesellschaft, München (DE)

( * ) Notice: Subject to any disclaimer, the term of this patent is extended or adjusted under 35 U.S.C. 154(b) by 243 days.

(21) Appl. No.: 13/146,456

(22) PCT Filed: Nov. 5, 2009

(86) PCT No.: PCT/EP2009/064699
§ 371 (c)(1),
(2), (4) Date: Jul. 27, 2011

(87) PCT Pub. No.: WO2010/086039
PCT Pub. Date: Aug. 5, 2010

(65) Prior Publication Data
US 2011/0277479 A1    Nov. 17, 2011

(30) Foreign Application Priority Data

Jan. 28, 2009 (DE) .......................... 10 2009 006 314

(51) Int. Cl.
*B01D 53/62* (2006.01)
*B01D 53/78* (2006.01)

(52) U.S. Cl.
USPC ........... 423/220; 423/228; 422/168; 422/187; 95/236; 96/234; 96/243

(58) Field of Classification Search
USPC ............. 423/220, 228; 422/168, 187; 95/236; 96/234, 243
See application file for complete search history.

(56) References Cited

U.S. PATENT DOCUMENTS

| | | | |
|---|---|---|---|
| 3,563,695 A | 2/1971 | Benson | |
| 3,823,222 A | 7/1974 | Benson | |
| 3,962,404 A | 6/1976 | Giammarco et al. | |
| 4,073,863 A | 2/1978 | Giammarco et al. | |
| 4,152,217 A | 5/1979 | Eisenberg et al. | |
| 4,160,810 A | 7/1979 | Benson et al. | |
| 4,384,875 A | 5/1983 | Batteux et al. | |
| 7,377,967 B2 | 5/2008 | Reddy et al. | |
| 7,918,926 B2 * | 4/2011 | Iijima et al. | 96/234 |
| 8,088,200 B2 * | 1/2012 | Wagner et al. | 95/179 |

(Continued)

FOREIGN PATENT DOCUMENTS

| DE | 1167318 | 4/1964 |
|---|---|---|
| DE | 2817084 A1 | 11/1978 |

(Continued)

*Primary Examiner* — Timothy Vanoy

(57) ABSTRACT

A method and corresponding apparatus for separation of carbon dioxide from an exhaust gas of a fossil-fired power are provided. In an absorption process, the exhaust gas containing carbon dioxide is brought into contact with an absorption medium so that the absorption medium is laden with carbon dioxide. In a desorption process, vapor from a water/steam circuit of the fossil-fired power plant is heated, wherein a laden absorption medium is regenerated. In a subsequent expansion process, the regenerated absorption medium is expanded so that a vapor and an expanded absorption medium are formed, wherein the vapor is recirculated into the desorption process. The laden absorption medium is divided into a first part stream and a second part stream. Only the second part stream is brought into heat-exchanging contact with the expanded absorption medium. The first and second part streams are supplied to the desorption process at different process stages.

16 Claims, 3 Drawing Sheets

(56) References Cited

U.S. PATENT DOCUMENTS

| | | |
|---|---|---|
| 8,414,694 B2 * | 4/2013 | Iijima et al. .................... 96/251 |
| 2008/0127831 A1 | 6/2008 | Rochelle et al. |

FOREIGN PATENT DOCUMENTS

| EP | 0012986 | A1 | 7/1980 |
| EP | 0133208 | A2 | 2/1985 |
| EP | 1688173 | A2 | 8/2006 |
| EP | 1736231 | A1 | 12/2006 |
| EP | 1759756 | A1 | 3/2007 |
| GB | 899611 | A | 6/1962 |
| GB | 1484050 | A | 8/1977 |
| JP | 11241618 | A | 9/1999 |
| RU | 2329858 | C2 | 7/2008 |
| RU | 2343962 | C2 | 1/2009 |
| RU | 2007125515 | C2 | 1/2009 |

* cited by examiner

METHOD AND DEVICE FOR SEPARATING OF CARBON DIOXIDE FROM AN EXHAUST GAS OF A FOSSIL-FIRED POWER PLANT

CROSS REFERENCE TO RELATED APPLICATIONS

This application is the US National Stage of International Application No. PCT/EP2009/064699, filed Nov. 5, 2009 and claims the benefit thereof. The International Application claims the benefits of German application No. 10 2009 006 314.5 DE filed Jan. 28, 2009. All of the applications are incorporated by reference herein in their entirety.

FIELD OF INVENTION

The invention relates to a method for operating a fossil-fired power plant and, in particular, to a method for the separation of carbon dioxide from an exhaust gas of a fossil-fired power plant. The invention relates, moreover, to a fossil-fired power plant having a separating apparatus for the separation of carbon dioxide from an exhaust gas.

BACKGROUND OF INVENTION

In fossil-fired power plants for generating electrical energy, an exhaust gas containing carbon dioxide occurs due to the combustion of a fossil fuel. This product is usually discharged into the atmosphere. The carbon dioxide which accumulates in the atmosphere obstructs the dissipation of heat from our earth and in this case leads to a rise in the earth's surface temperature due to what is known as the greenhouse effect. In order to achieve a reduction in the carbon dioxide emission in fossil-fired power plants, carbon dioxide can be separated from the exhaust gas.

Various methods are known, in general, for separating carbon dioxide from a gas mixture. The absorption/desorption method is customary especially for separating carbon dioxide from an exhaust gas after a combustion process.

The described separation of carbon dioxide by means of the absorption/desorption method is carried out on an industrial scale by means of a scrubbing agent. In a conventional absorption/desorption process, the exhaust gas is brought into contact in an absorption column with a selective solvent as a scrubbing agent. In this case, the uptake of carbon dioxide takes place by means of a chemical or physical process. The purified exhaust gases is purged from the absorption column for further processing or discharge. The solvent laden with carbon dioxide is conducted into a desorption column in order to separate the carbon dioxide and regenerate the solvent. Separation in the desorption column may take place thermally. In this case, the laden solvent is heated, a gas/vapor mixture of gaseous carbon dioxide and of the evaporated solvent being obtained, what is known as the exhaust vapors. The evaporated solvent is subsequently separated from the carbon dioxide. The carbon dioxide can then be compressed and cooled in a plurality of stages. In the liquid or frozen state, the carbon dioxide can then be delivered for storage or utilization. The regenerated solvent is conducted anew to the absorber column, where it can take up carbon dioxide again from the exhaust gas containing carbon dioxide.

The main problem in the existing methods for the separation of carbon dioxide from an exhaust gas is particularly of the very high energy outlay which is required in the form of heating energy for desorption. It has not hitherto been possible in the prior art to discover any useful improvements in this which would sufficiently reduce the energy outlay of a separating plant for the separation of carbon dioxide which is integrated into a power plant process.

In the chemical industry a multiplicity of extended circuit link-ups for saving heat energy in the desorption process are known. Thus, EP0133208 shows a method for assisting the regeneration of the absorbent in the desorber, what is known as the lean solvent flash method. EP1759756-A1 shows the lean solvent reheating method in which desorption process is assisted laterally. A circuit-link up disclosed in DE2817084-C2 assists the absorption process by means of side cooling. A further method for an extended circuit link-up is disclosed by patent specification DE1167318 as what is known as the split feed method.

SUMMARY OF INVENTION

However, known standard methods for extended circuit link-ups from the chemical industry for the separation of carbon dioxide from an exhaust gas cannot readily be adapted to other applications. Precisely when the carbon dioxide separation method is integrated into a power plant process, the extended circuit link-up may, in the overall balance, in interaction with the power plant process, exhibit a markedly reduced energy saving or even have an adverse effect.

Even a possible lowering of the intrinsic energy requirement does not necessarily lead to a rise in overall efficiency. Also, with integration into the power plant process, no favorable overall efficiency is to be expected from a mutual interaction. The additional outlay therefore would not be justified in economic terms.

The general disadvantage of separating methods for carbon dioxide which are known from the prior art therefore continues to be particularly the high energy outlay. Precisely when the separating method is integrated into a fossil-fired power plant, this leads to an undesirable deterioration in the overall efficiency of the fossil-fired power plant. Even when the standard method is broadened by means of a known extended circuit link-up from the chemical industry, it has not hitherto been possible to lower the intrinsic energy requirement of the separating method appreciably.

One object of the invention is to propose a method for the separation of carbon dioxide from an exhaust gas of a fossil-fired power plant, which method makes it possible to have a high separation efficiency, along with a low intrinsic energy requirement and, at the same time, a favorable overall plant efficiency of the power plant process.

A further object of the invention is to propose a fossil-fired power plant having a separating apparatus for carbon dioxide, which makes it possible to have a high separation efficiency, along with a low intrinsic energy requirement and, at the same time, a favorable overall efficiency of the power plant.

The object aimed at a method is achieved, according to the invention, by means of a method for the separation of carbon dioxide from an exhaust gas of a fossil-fired power plant, in which a fossil fuel is burnt in a combustion process, an exhaust gas containing carbon dioxide being generated, the exhaust gas containing carbon dioxide is brought into contact with an absorption medium in a subsequent absorption process, carbon dioxide being taken up by the absorption medium, a laden absorption medium and a purified exhaust gas being formed, the laden absorption medium is regenerated in a subsequent desorption process, a regenerated absorption medium being formed, the laden absorption medium being delivered to the desorption process at least in a first part stream and a second part stream, and regenerated absorption medium is expanded in an expansion process, vaporous absorption medium being formed, and the vaporous absorption medium being recirculated into the desorption process.

The invention in this case proceeds from the idea of adopting methods known from chemical process engineering in order to achieve the object. It is expedient to select from the abundance of different proven and perfected additional circuit link-ups methods which do not compensate or even overcompensate their positive properties, even in interaction with one another, when used in the power plant process. The essence of the invention is in this case to combine the methods with one another in such a way that the positive effects of the methods can largely be added to one another. This is achieved, according to the invention, by means of a directed combination of the split feed method with the lean solvent flash method. Surprisingly, precisely in the combination of these two methods, the finding is arrived at that the intrinsic energy consumption of the separating apparatus can be lowered decisively and, moreover, the overall efficiency of the power plant process having carbon dioxide separating plants can be markedly increased. The costs of the carbon dioxide separation process are thereby drastically lowered.

In the lean solvent flash method, evaporation in the sump of the desorption column is assisted by a vacuum flash tank. In this case, use is made of the effect that the boiling temperature of the solvent falls in the case of a lower pressure. The electrical energy necessary for generating the vacuum in the flash tank is so low, as compared with the thermal energy saved in the evaporation of the solvent, that the overall balance is positive.

In the split feed method, the stream of laden solvent coming from the absorption column is divided and is partially introduced, cold, into the head of the desorption column. As a result, the exhaust vapors contained in the head of the desorption column are already largely condensed. This relieves the condenser following the desorption column, so that the condenser does not have to discharge the heat outward via cooling water. Instead, the heat may be used directly for heating the laden solvent.

According to the invention, these methods are combined in a directed manner and are integrated into the power plant process. For this purpose, laden absorption medium is delivered to the desorption process in at least two part streams. No additional energy is required for delivery in at least two part streams. The first part stream is in this case delivered to the desorption process in a process stage in which exhaust vapors are predominantly present in the desorption process. By the exhaust vapors being acted upon by laden absorption medium from the first part stream, the exhaust vapors condense. As a result, the condensation process which follows the desorption process is relieved, and electrical energy for the routing of cooling water of the condensation process is saved. Furthermore, the laden absorption medium delivered is heated as a result of condensation and is available for the desorption process. Since the need for preheating is avoided, heating energy in the form of heating vapor is saved in the desorption process.

The second part stream is delivered to the desorption process in a process stage in which it is directly available for the desorption process. A delivery of laden absorption medium in a plurality of part streams in a plurality of process stages of the desorption unit may likewise be envisaged.

The regenerated absorption medium then leaving the desorption process is then delivered to an expansion process in which it is expanded. Electrical energy is expended in order to generate a vacuum. As a result of expansion, part of the absorption medium evaporates. The expansion process thus separates liquid absorption medium from vaporous absorption medium. The vaporous absorption medium is then recirculated into the desorption process. As a result, the recirculated vaporous absorption medium assists the desorption process and thus leads to a saving of heat energy in the form of heating vapor. The saved heating vapor can therefore be used in the power plant process for generating electrical energy.

The combination of the split feed method with the lean solvent flash method surprisingly exerts only a very minimal reciprocal influence. Thus, without considerable subtractions, the contribution to the intrinsic energy consumption of the separation method by the individual methods can virtually be added together. In this case, separation efficiency is increased. It is in this case especially surprising that, by the two methods being combined according to the invention, the overall efficiency of the power plant process is also increased to the same extent.

In an advantageous development of the carbon dioxide separation method, the first part stream is set at a temperature $T_1$ and the second part stream is set at a temperature $T_2$. In this case, the temperature $T_1$ is lower than the temperature $T_2$. The temperature $T_1$ in this case corresponds approximately to the temperature of the laden absorption medium leaving the absorption process. It may also be necessary to set the temperature $T_1$ to another temperature, depending on the operating conditions of the desorption process. The setting of the temperatures may take place by means of a regulating process. The temperature $T_1$ and the temperature $T_2$ are regulated as a function of the operating conditions required in the desorption process.

In a further advantageous refinement of the carbon dioxide separation method, regenerated absorption medium is in the expansion process separated, and, in a heat exchanger process, heat is extracted from the regenerated absorption medium and is delivered to the laden absorption medium in the second part stream. This makes it possible to utilize the heat which still remains in the regenerated absorption medium, in order to heat the laden absorption medium in the second part stream. Thus, by the heat exchanger process being regulated, the setting of the temperature $T_2$ can be carried out at the same time.

Expediently, the expansion process is carried out at a pressure $P_1$ and the desorption process at a pressure $P_2$, the pressure $P_1$ being set lower than the pressure $P_2$. Owing to the lower pressure $P_1$ in the expansion process, the evaporation of the absorption medium is achieved. The pressure $P_2$ may in this case lie above atmospheric pressure, and consequently the pressure $P_1$ may be a pressure between atmospheric pressure and the pressure $P_2$. In a particular development of the carbon dioxide separation method, in this case the pressure $P_2$ is set approximately to atmospheric pressure. This takes place, in practice, in that the desorption process is carried out at atmospheric pressure. The pressure $P_1$ is consequently set to a pressure below the atmospheric pressure.

In an advantageous development of the carbon dioxide separation method, the vaporous absorption medium is condensed before being recirculated into the desorption process. In this case, the pressure $P_1$ is raised to the pressure $P_2$. The aim of compression is to recirculate the vaporous absorption medium into the desorption process. Recirculation in this case preferably takes place in the region of the sump.

Expediently, the laden absorption medium is extracted from the absorption process in an overall stream, the overall stream being divided into at least the first part stream and the second part stream. Division into several part streams is likewise possible. The division into the first part stream and the second part stream is preferably controlled by means of a regulating process. Regulation in this case takes place as a function of operating conditions required in the desorption process. A division is to be understood also as meaning a branch-off or partial extraction. In principle, the extraction of laden absorption medium from the absorption process in several part streams may also be envisaged.

In an advantageous development of the carbon dioxide separation method, a gas/vapor mixture of gaseous carbon dioxide and vaporous absorption medium is formed in the desorption process as a result of the regeneration of the laden absorption medium, condensate being condensed out of the gas/vapor mixture in a condensation process. The condensation process in this case follows the desorption process. The gas/vapor mixture is largely exhaust vapors. The composition of the condensate is dependent on the absorption medium used. In the method according to the invention, largely pure water is condensed out. Due to the split feed method, the condensation process is appreciably relieved, so that, on the one hand, less cooling water has to be provided for condensation and, on the other hand, less condensate also occurs.

A solution of $H_2O$ and of amine derivatives is preferably used as absorption medium. As compared with ammonia-based absorption media, dealing with a solution of $H_2O$ and of amine derivatives entails fewer risks and adverse environmental influences.

The method is preferably employed in a fossil-fired steam power plant or in a combined-cycle power plant.

The object aimed at an apparatus is achieved by means of a fossil-fired power plant with a separating apparatus for carbon dioxide which follows a combustion apparatus and through which an exhaust gas containing carbon dioxide is capable of flowing, the separating apparatus having an absorption unit for the uptake of carbon dioxide from the exhaust gas containing carbon dioxide and a desorption unit for dispensing the taken-up carbon dioxide, the absorption unit being connected to the desorption unit via a connecting line for the purpose of conducting a laden absorption medium, the connecting line having a first subline and a second subline, and the first subline and second subline being connected to the desorption unit at various junction points, and the desorption unit being connected to a pressure tank, a vapor formed in the pressure tank being recirculatable into the desorption unit via a vapor line.

The invention in this case proceeds from the idea of integrating the split feed circuit link-up together with the lean solvent flash into the separating apparatus. For this purpose, the connecting line has a first and a second subline. Further sublines are possible. The first subline is in this case connected to the desorption unit at a junction point other than that of the second subline. If the desorption column is set up vertically, the junction points are spaced horizontally apart from one another. The horizontal arrangement of the junction points may vary as a consequence of construction. The sublines are designed for conducting a laden absorption medium.

The desorption unit is followed by a pressure tank which is connected to the desorption unit via a suitable line for conducting a regenerated absorption medium. The pressure tank is what is known as a flash tank in which a medium can be evaporated. Moreover, the pressure tank is connected to the desorption unit via a recirculation line for vapor.

The split feed circuit link-up can be combined with the lean solvent flash in a surprising way. Only an insignificant influence exerted via the two circuit link-ups one upon the other as a result of the operation of the fossil-fired power plant can be found. Thus, without considerable subtractions, the contribution to reducing the intrinsic energy consumption of the separation method and the contribution to the overall efficiency of the power plant process by the individual methods can be added together, this being achieved, moreover, with an increasing separation efficiency.

In an expedient development of the fossil-fired power plant, the connecting line is connected to the absorption unit at one junction point. An absorption medium to be conducted out of the absorption unit during operation is therefore discharged by the connecting line at only one point. A plurality of junction points at which absorption medium to be conducted out is discharged may also be envisaged. The plurality of junction points may in this case be spaced apart from one another vertically or horizontally in the case of an absorption column set up vertically.

A vacuum can preferably be set in the pressure tank. For this purpose, the pressure tank is designed correspondingly and comprises a vacuum pump and pressure valves.

In a particular development of the fossil-fired power plant, a heat exchanger is provided, which is inserted on the primary side into the second subline and which is connected on the secondary incoming side to the pressure tank and on the secondary outgoing side to the absorption unit. As a result, when the fossil-fired power plant is in operation, heat can be transferred from a regenerated absorption medium in the pressure tank to a laden absorption medium in the second subline. The regenerated absorption medium is thus cooled for renewed use in the absorption unit, and the laden absorption medium is heated for regeneration in the desorption unit.

In an advantageous refinement of the fossil-fired power plant, a compressor is inserted into the vapor line. The compressor is an apparatus by means of which a vapor can be transferred out of the pressure tank into the desorption unit. The compressor is preferably a vacuum pump with a backflow check valve. The backflow check valve prevents medium from flowing out of the desorption unit back into the pressure tank.

In a further advantageous development of the invention, a regulating valve is provided, which is connected to the absorption unit via the connecting line and which is connected to the desorption unit via the first subline and via the second subline, so that, during operation, an absorption medium flowing through the connecting line can be apportioned in a ratio V to the first subline and to the second subline. Regulation in this case takes place as a function of operating conditions required in the desorption unit.

The fossil-fired power plant is preferably configured as a steam power plant comprising a fired boiler and a steam turbine, or as a combined-cycle power plant comprising a gas turbine and a waste heat recovery steam generator which follows the gas turbine on the exhaust gas side and which is inserted into the water/steam circuit of a steam turbine.

BRIEF DESCRIPTION OF THE DRAWINGS

Exemplary embodiments of the invention are explained in more detail below by means of accompanying, diagrammatic drawings, in which.

DETAILED DESCRIPTION OF INVENTION

Figure 1:
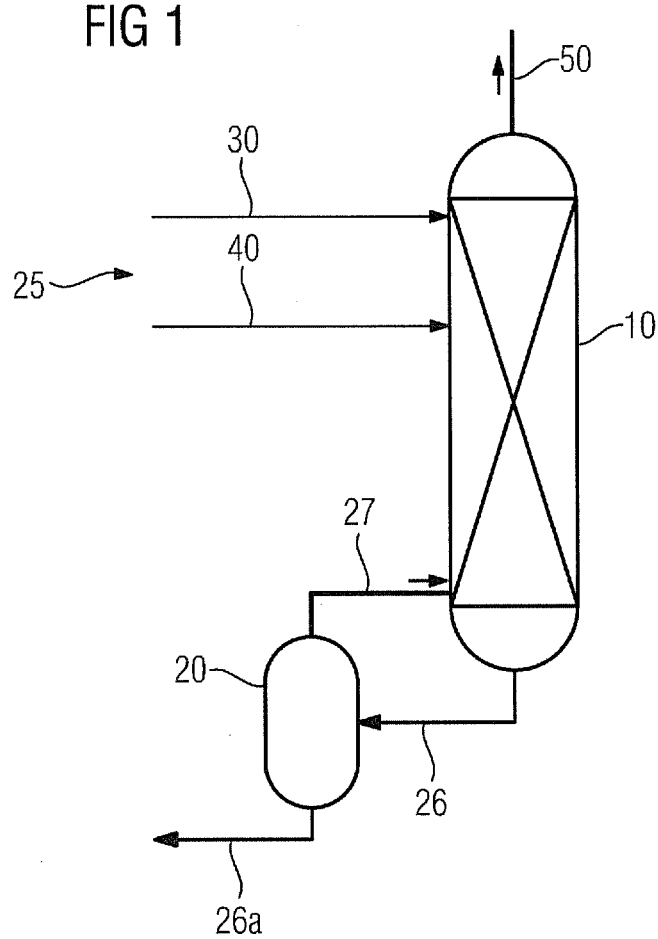
FIG. 1 shows an exemplary embodiment of a carbon dioxide separation method of a fossil-fired power plant.

The carbon dioxide separation method illustrated in FIG. 1 has essentially a desorption process 10 and an expansion process 20.

Laden absorption medium 25 is delivered to the desorption process via a first part steam 30 and a second part steam 40. Delivery takes place in various process stages of the desorption process 10. In the desorption process 10 the laden absorption medium 25 is regenerated. In this case, a gas/vapor mixture 50 of carbon dioxide and a vaporous absorption medium is formed. The gas/vapor mixture 50 and a regenerated absorption medium 26 leave the desorption process 10.

The regenerated absorption medium 26 is subsequently delivered to the expansion process 20. In the expansion process 20, vaporous absorption medium 27 is separated from the regenerated absorption medium 26a at a pressure which is lower than the pressure in the desorption process. The regenerated absorption medium 26a is conducted out of the expansion process 20 and recirculated into the absorption circuit. The vaporous absorption medium 27 is recirculated into the desorption process.

Figure 2:
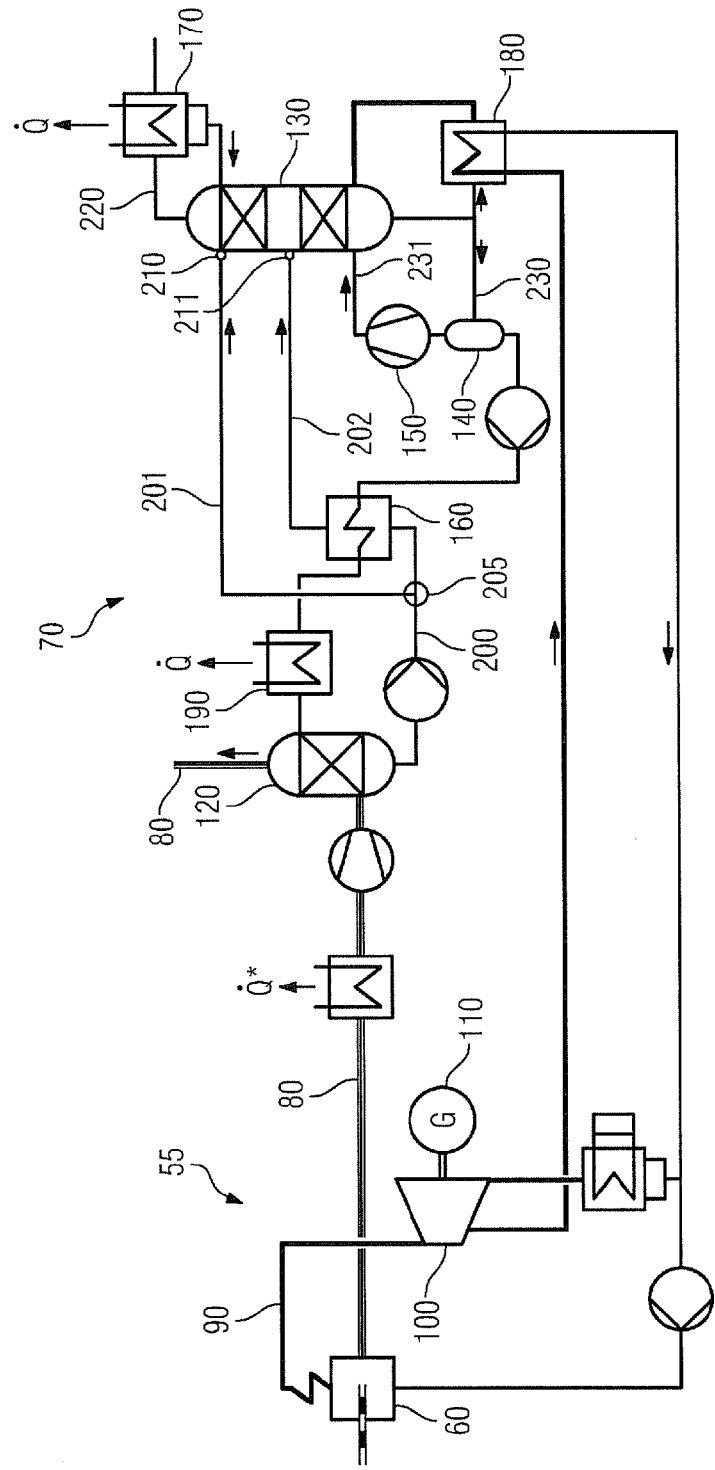
FIG. 2 shows an exemplary embodiment of a steam power plant with a carbon dioxide separating apparatus.

The steam power plant illustrated in FIG. 2, with an integrated separating apparatus for carbon dioxide, comprises essentially a fossil-fired steam generator 60, and a separating apparatus for carbon dioxide 70 which follows the fossil-fired steam generator 60.

The fossil-fired steam generator 60 is connected to the separating apparatus 70 via an exhaust gas line 80 for the discharge of the exhaust gas. Moreover, the steam generator 60 is inserted into a water/steam circuit 90. The fired boiler 60 is connected via the water/steam circuit 90 to a steam turbine 100 by means of which a generator 110 can be driven.

The separating apparatus 70 consists of an absorption unit 120, of a desorption unit 130, of a pressure tank 140, of a compressor 150, of a heat exchanger 160, of a condenser 170, of a heating device 180 and of a heat exchanger 190.

The absorption unit 120 is inserted into the exhaust gas line 80. Further devices, for example desulfurization plants or blowers, may be inserted into the exhaust gas line 80. To conduct a laden absorption medium, the absorption unit 120 has an absorption medium line 200 connected to it. This branches at a branch 205 into a first subline 201 and a second subline 202. The first subline 201 is connected to the desorption unit 130 at the first junction point 210 and the second subline 202 at the second junction point 211. The heat exchanger 160 is inserted on the primary side into the second subline 202.

The desorption unit 130 is followed by a condenser 170 which is connected to the desorption unit 130 via a condensate line 220.

The desorption unit is connected to the absorption unit 120 and to the heating device 180 via an absorption medium line 230. The pressure tank 140 is inserted into the absorption medium line 230. This pressure tank is designed for a vacuum and is connected to the desorption unit 130 via a vapor line 231. The compressor 150 is inserted into the vapor line 231. What are not illustrated here are further devices for generating and regulating the vacuum in the pressure tank 150. Furthermore, the desorption unit 140 is connected to the heating device 180 via the absorption medium line 230.

The absorption medium line 230 is linked up on the secondary side to the heat exchanger 160, so that heat is extracted from an absorption medium carried in the absorption medium line 230 and can be transferred to an absorption medium carrying the second subline 202.

In addition, further devices may be inserted into the absorption medium line 230. Thus, for example, a heat exchanger or an absorption medium pump. The heating device 180 corresponds to a heat exchanger and is inserted into the water/steam circuit 90. The water/steam circuit 90 may have further devices, such as, for example, coolers or pumps.

Figure 3:
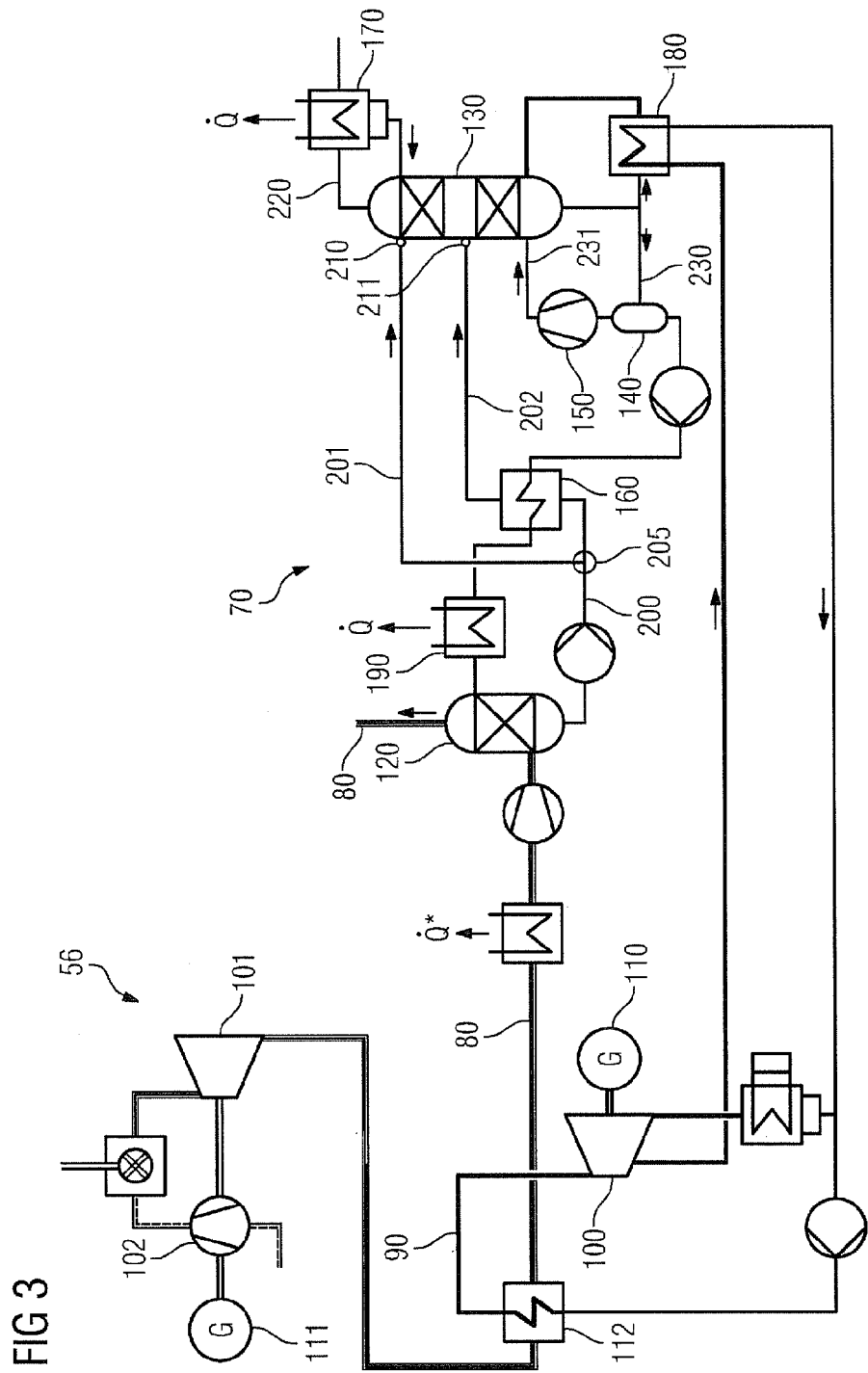
FIG. 3 shows an exemplary embodiment of a combined-cycle power plant with a carbon dioxide separating apparatus.

FIG. 3 illustrates a combined-cycle power plant 56 with an integrated carbon dioxide separating apparatus 70. The combined-cycle power plant 56 comprises essentially a gas turbine 101 which drives a process compressor 102 and a generator 111 via a shaft, a waste heat recovery steam generator 112 which follows the gas turbine 101 on the exhaust gas side and which is fired by the gas turbine 101 and is provided for steam generation, and a steam turbine 100 which is connected to a generator 110 via a shaft and which is connected to the waste heat recovery steam generator 112 by means of a steam line. The waste heat recovery steam generator 112 is connected, so as to conduct exhaust gas, to the separating apparatus 70. The following separating apparatus 70 is configured essentially in a similar way to that of the steam power plant 55 in FIG. 2.

The advantages according to the invention should in this case be made clear by the example of an 800 MW power plant process fired by bitumen coal. In fossil combustion processes of this type, an exhaust gas with approximately 10 to 15 percent by volume of carbon dioxide is obtained. With a separation rate of 90% to be achieved for the carbon dioxide contained in the exhaust gas, a thermal energy requirement of 3.5 $GJ/t_{CO2}$, using the standard circuit link-up of the carbon dioxide separation process, is required in order to separate one ton of $CO_2$. The standard circuit link-up of an absorption/desorption process stands as a reference for the following calculation.

Using the split feed method, the thermal energy requirement for separating one ton of $CO_2$ can be lowered to 3.1 $GJ/t_{CO2}$. As compared with the reference, the losses of overall electrical power can thereby be reduced by 7.5%. This measure lowers the relative $CO_2$ avoidance costs of the separation process by 9.9%.

The individual integration of the lean solvent flash method makes it possible to lower the energy requirement for separating one ton of $CO_2$ to 2.3 $GJ/t_{CO2}$. The losses of overall electrical power can thereby be reduced by 9.2%, so that the relative $CO_2$ avoidance costs of the separation process are reduced by 8.2%.

By virtue of the invention, then, the advantages of the two methods can virtually be added together. Thus, the combination of the two methods does not have an adverse effect on the intrinsic energy requirement, and therefore, in this operating example, 2.3 $GJ/t_{CO2}$ are required in order to separate one ton of $CO_2$. The losses of overall electrical power can be reduced by 15% and the relative $CO_2$ avoidance costs of the separation process can be lowered even by 16.9%.

Thus, by virtue of the invention, a power plant process with an integrated separation process for carbon dioxide can be provided, in which a marked increase in the current quantity produced by the power plant can be achieved by means of directed combination of the split feed method with the lean solvent flash method. This is possible, since the intrinsic energy requirement of the separation process of the combination is surprisingly substantially lower than that of the individual circuit link-ups. Since at the same time the investment requirements are low, the costs of the carbon dioxide separation can be lowered drastically.

The invention claimed is:

1. A method for the separation of carbon dioxide from an exhaust gas of a fossil-fired power plant, the method comprising:

an absorption process wherein the exhaust gas containing carbon dioxide is brought into contact with an absorption medium so that an absorption medium laden with carbon dioxide is formed, a desorption process wherein vapor from a water/steam circuit of the fossil-fired power plant is heated, and in which a laden absorption medium is regenerated so that a regenerated absorption medium is formed, an expansion process following the desorption process, wherein the regenerated absorption medium is expanded so that a vapor and an expanded absorption medium are formed, wherein the vapor is recirculated into the desorption process, wherein the laden absorption medium is divided at least into a first part stream and a second part stream, and wherein only the second part stream is brought into heat-exchanging contact with the expanded absorption medium, and the first part stream and the second part stream are supplied to the desorption process at different process stages.

2. The method as claimed in claim 1, wherein the first part stream is set at a first temperature and the second part stream is set at a second temperature, the first temperature being lower than the second temperature.

3. The method as claimed in claim 1, wherein the expansion process is carried out at a first pressure, and in which the desorption process is carried out at a second pressure, the first pressure being set lower than the second pressure.

4. The method as claimed in claim 3, wherein the second pressure corresponds approximately to the atmospheric pressure.

5. The method as claimed in claim 1, wherein at the expansion process, the vaporous absorption medium is condensed before being recirculated into the desorption process.

6. The method as claimed claim 1, wherein the laden absorption medium is extracted from the absorption process in an overall stream, the overall stream being divided into the first part stream and the second part stream.

7. The method as claimed in claim 1, wherein a gas/vapor mixture of gaseous carbon dioxide and vaporous absorption medium is formed in the desorption process as a result of the regeneration of the laden absorption medium, a condensate being condensed out of the gas/vapor mixture in a condensation process.

8. The method as claimed in claim 1, wherein a solution of $H_2O$ and of amine derivatives is used as absorption medium.

9. The method as claimed in claim 1, wherein the method is used in a fossil-fired steam power plant.

10. The method as claimed in claim 1, wherein the method is used in a combined-cycle power plant.

11. An apparatus, which is integrated into a fossil-fired power plant, for the separation of carbon dioxide, the apparatus comprising:

an absorption unit, the absorption unit being connected into an exhaust line of the fossil-fired power plant such that exhaust gas containing carbon dioxide is conducted through the absorption unit, a desorption unit, the desorption unit being connected into a water/steam circuit of the fossil-fired power plant such that the desorption unit is operable to be heated by heating vapor extracted from the water/steam circuit, a connecting line connected to the absorption unit for the purpose of conducting a laden absorption medium, a pressure tank, wherein the desorption unit is connected to a pressure tank via an absorption medium line, such that a regenerated absorption medium can be supplied to the pressure tank and the pressure tank is connected to the desorption unit via a vapor line such that vapor can be recirculated into the desorption unit, and wherein the pressure tank is connected to the absorption unit via an absorption medium recirculation line, wherein the connecting line branches into at least one first subline and one second subline, the sublines being connected to the desorption unit at various junction points, and wherein only one heat exchanger is provided in the absorption medium recirculation line, which heat exchanger is connected at the primary side into the second subline and at the secondary side into the absorption medium recirculation line.

12. The apparatus for the separation of carbon dioxide as claimed in claim 11, wherein a vacuum is set in the pressure tank.

13. The apparatus for the separation of carbon dioxide as claimed in claim 11, wherein a compressor is inserted into the vapor line.

14. The apparatus for the separation of carbon dioxide as claimed in claim 11, wherein a regulating valve is provided, which is connected on an incoming side to the absorption unit via the connecting lin and which is connected on an outgoing side to the desorption unit via the first subline and via the second subline, so that, during operation, an absorption medium flowing through the connecting line is apportioned in a ratio V to the first subline and to the second subline.

15. The apparatus for the separation of carbon dioxide as claimed in claim 11, integrated into a steam power plant comprising a fossil-fired steam generator and a steam turbine.

16. The apparatus for the separation of carbon dioxide as claimed in claim 11, integrated into a combined-cycle power plant comprising a gas turbine and a waste heat recovery steam generator which follows the gas turbine on an exhaust gas side and which is inserted into a water/steam circuit of a steam turbine.

* * * * *